United States Patent [19]

Ragle

[11] Patent Number: 4,565,927

[45] Date of Patent: * Jan. 21, 1986

[54] RADIATION GENERATION OF "SIGNATURE" FOR REELED-WEB

[75] Inventor: Herbert U. Ragle, San Mateo, Calif.

[73] Assignee: Burroughs Corporation, Detroit, Mich.

[*] Notice: The portion of the term of this patent subsequent to Jul. 6, 1994 has been disclaimed.

[21] Appl. No.: 661,844

[22] Filed: Oct. 17, 1984

Related U.S. Application Data

[63] Continuation-in-part of Ser. No. 351,952, Feb. 24, 1982, which is a continuation-in-part of Ser. No. 53,304, Jun. 29, 1979, Pat. No. 4,337,659, and Ser. No. 342,242, Jan. 25, 1982, Pat. No. 4,485,674.

[51] Int. Cl.$^4$ ............................................. G01N 21/86
[52] U.S. Cl. ..................................... 250/560; 356/376; 382/1
[58] Field of Search .................... 250/570, 560, 561; 73/432, 490; 382/1; 356/71, 376, 348

[56] References Cited

U.S. PATENT DOCUMENTS 4,200,394  4/1980  Bartlett et al. ...................... 356/348
4,337,659  7/1982  Ragle ................................... 73/432

Primary Examiner—David C. Nelms
Attorney, Agent, or Firm—John J. McCormack; Nathan Cass; Kevin R. Peterson

[57] ABSTRACT

One embodiment discloses a method and apparatus whereby each time a tape is wound upon a prescribed reel, the winding pattern may be assumed to leave the array of tape edges in a unique "edge profile" represented by the position of each winding edge as viewed from one side of the reel along a radial direction—this "profile" being interpreted as a "winding signature"; the signature may be detected via reflections of an energy beam and recorded in a convenient encoded fashion for possible use in uniquely identifying and documenting each unspooling/rewind sequence to thereby determine whether the tape has been "unspooled".

20 Claims, 16 Drawing Figures

RADIATION GENERATION OF "SIGNATURE" FOR REELED-WEB

This is a continuation-in-part of my U.S. Ser. No. 351,952 for "Photo-electric Means for Determining 'Signature' for Reeled-Web" filed on Feb. 24, 1982, and commonly assigned; which is a continuation-in-part of my U.S. Ser. No. 053,304, filed 6-29-79, now U.S. Pat. No. 4,337,659, and of U.S. Ser. No. 342,242 filed 1-25-82, now U.S. Pat. No. 4,485,674.

BACKGROUND, FEATURES OF INVENTION

This invention relates to means for enhancing the security of tape files; and more particularly to methods and associated apparatus for detecting whether a given reel of tape has been unspooled and rewound; doing so photo-electrically.

Workers in the art of making and using spooled webs, such as magnetic tape, are, at times, very concerned about security—e.g., about knowing whether or not a given tape segment has been used during a certain time period. Such problems are extreme in the magnetic tape art where it is becoming extremely important to be able to detect the use of sensitive tape files. Such files may contain very valuable highly sensitive data (e.g., a "scrambler code" used for transmitting secret, proprietary data over a relatively non-secure transmission medium).

Thus, many workers in the related arts would be intensely interested in being able to detect whether or not a given reel of tape has been "used"; that is, whether the reel has been mounted on a tape drive and the tape unspooled and operated-upon (e.g., read magnetically and/or written-upon, etc.) during a given reference period—e.g., since the reel was last checked by a security officer.

It is also well known that personnel having legitimate access to such tape files may, at times, be severely tempted to abuse their power and use tapes illegitimately and in secret—e.g., surreptitiously withdrawing a reel of tape and mounting it on a tape drive to run it past a read head so as to make a copy-tape of sensitive data thereon.

The subject invention provides a solution, at least in part, to this problem and a possible deterrent to such illegitimate use of tape files—doing so by teaching formulation of a "reeled-web signature" which can indicate whether a given reel of tape has ever been unspooled and respooled. It goes without saying that workers in the art will find such an invention of tremendous value and help.

I have noticed that a typical length of magnetic tape such as mylar tape segment t shown in FIG. 2 as wound upon an associated tape reel R-1 winds upon its reel or spool in a certain "random spooled" fashion, tape t may be understood as conventional, comprising a magnetic recording web about one-half inch wide by about 1–5 mils thick and having magnetic material recorded on one or both sides of its mylar (or like) substrate. The tape is typically wrapped upon itself several thousand times about the hub of a reel R-1 as is well known in the art. I have observed that each time such a length of tape is unwound and then rewound upon a storage spool, the successive turns, or "reeled layers" of tape virtually never sit in registry exactly atop one another—rather they assume a "stacking profile" that is characteristically "random" as it quite schematically indicated in FIGS. 3 and 4.

Such an unspooling and rewinding would typically take place in the course of mounting the reel of tape (e.g., supply reel R-2 in FIG. 1) in operative position on an associated tape drive apparatus TD as well known in the art and threading the tape t through a read head apparatus R, and intermediate tape guide means, to terminate on a take-up reel R-1. Thus, as the tape is unspooled from supply reel R-2 and drawn past the read head RH and the intermediate guides, it will be understood as taken-up by take-up reel R-1 in a prescribed well known fashion.

While I cannot be sure, I believe that the cause(s) of this "random" stacking profile derive, in part, from such things as the random infiltration of ambient air between tape turns during wind-up, from shifting tension forces on the tape during spooling and unspooling and/or from a shift in winding tension.

Thus, I have formulated a technique for detecting whether a given reel of tape has been unspooled and rewound—even partially—this technique involving a determination of the reeled-tape "signature" after any, or all, winding sequence, as more particularly described below.

I have, further, devised an improved tape reel wherein a "reference locus" may be automatically provided in a tape reel for comparison with the wrapping profile of the tape.

Moreover, the subject invention also teaches techniques and apparatus for automatically detecting such a wrapping profile or "signature" for any (every) tape-wrapping sequence. That is, each time a segment of tape is wrapped upon a spool, the wrapping profile may be automatically detected and identified uniquely (and preferably encoded) so that each such tape-wrapping sequence can provide a unique "finger-print" of itself—this preferably being done automatically or semi-automatically.

If such a "signature" be recorded it may be used as a means of indicating any and all uses of the tape which involve any spooling of tape segment. For instance, a "wind-up log" may be kept for each reel, and dated, so that unauthorized "unspooling and associated use" can be automatically detected and attended to—e.g., by a "spot check" of the wind-up log for that reel. Such a practice can obviously be used as a powerful deterrent to any would-be malfactors also!

Thus, it is an object of the subject invention to provide at least some of the foregoing solutions and features of advantage. Another object is to provide a method and means of determining whether a segment of tape has been unspooled and rewound. A related object is to provide a wrapping profile or "signature" of a "reeled web".

A further object is to provide a determination of the wrapping profile for a spooled tape. Yet a further object is to detect such a wrapping profile, or signature, of a spooled tape segment in a prescribed encoded form, convenient for use in improving security against illegitimate tape usage, etc. A further object is to provide related techniques and apparatus to detect such a signature of reeled web segments. A further object is to provide improved techniques and associated apparatus for spooling tape segments on a prescribed reel. A further related object is to provide prescribed reference loci on such a tape reel for better determining such a "signature". A particular object is to do this with photoelectric means.

BRIEF DESCRIPTION OF THE DRAWINGS

These and other features and advantages of the present invention will be appreciated by workers as they become better understood by reference to the following detailed description of present preferred embodiments; these being considered in conjunction with the accompanying drawings, wherein like reference symbols denote like elements.

FIg. 2 is a somewhat schematized top view of a typical magnetic tape reel with a segment of tape wrapped thereon in the usual manner and including a signature-detector according to one aspect; while FIG. 2A is an isometric elevation of a small arcuate section of this reel; and FIG. 3 is a side elevation of this section, with the edges of the tape wound on the reel being emphasized for clarity and viewed in profile from the side, and enlarged; while

FIGS. 9, 10, 11, 12, 13, illustrate a preferred embodiment for detecting this "profile" photoelectrically (after the manner of FIGS. 2, 4 and 5); while

In General; Determination of typical "signature" for reel-web; FIGS. 1–4:

As suggested before, FIGS. 2–4 are a schematized, rather idealistic representation of a typical segment of tape t wrapped upon a conventional spool of reel R-1 (tape t, as described above). Thus, FIG. 2 will be understood as a somewhat simplified upper isometric of a tape reel R-1 on which segment t of magnetic recording tape will be assumed as conventionally wound. Here, and elsewhere in this disclosure, it may be assumed that the methods, materials, structure and related techniques are conventional as practiced in the art today, except as otherwise specified.

Figure 1:
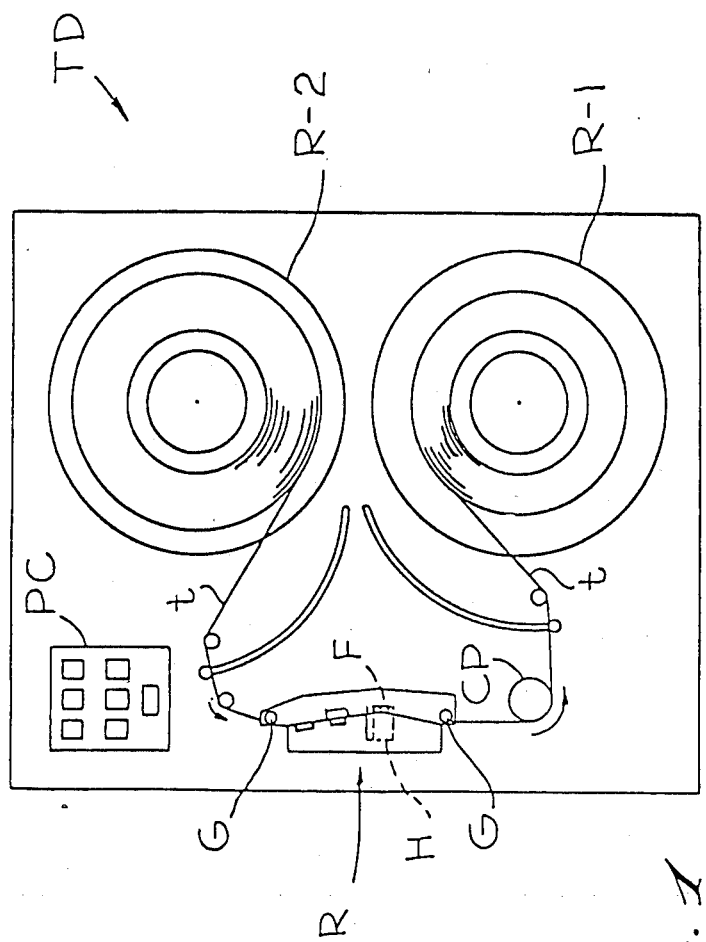
FIG. 1 is a very schematic idealized frontal showing of salient elements of a prior art tape drive.
Figure 2:
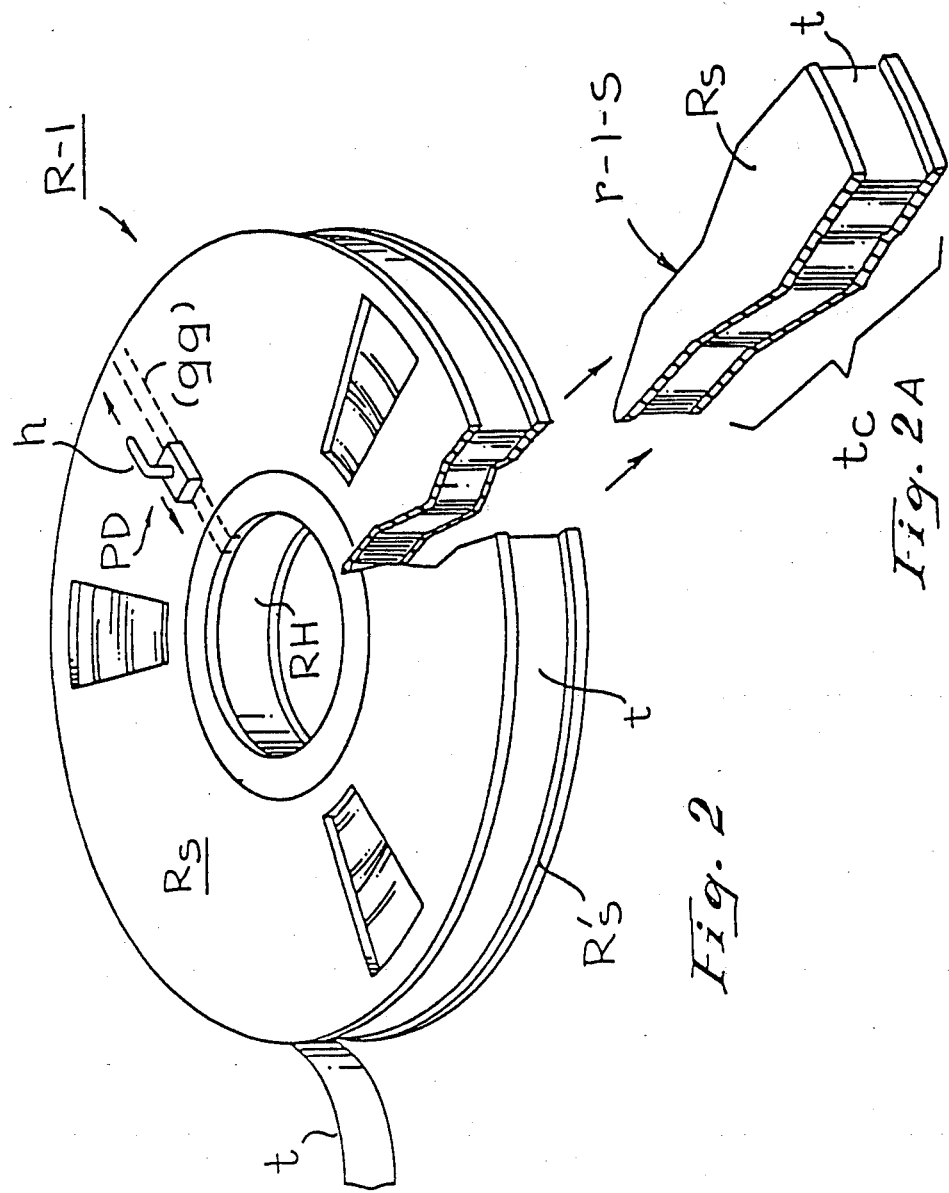
Figure 3:
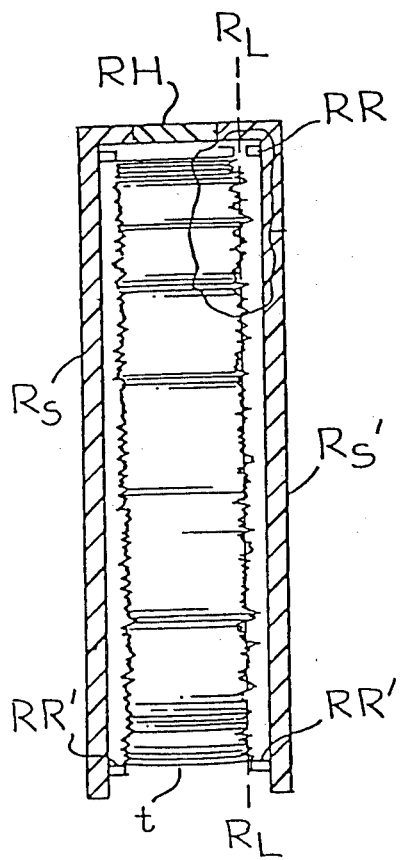

The "slice-of-pie" sectorial section from reel R-1 in FIG. 2A will be understood as exploded-away; and as shown rotated 90° in FIG. 3, representing a cross-section of the tape as wound in a given wrapping configuration upon the hub of reel R-1. The overlapping layers of tape t (see section at 2-C, FIG. 2A) will be understood as wound in conventional randomly-superposed fashion upon the outer cylindrical periphery of reel hub RH, the tape spool lying between the sides $R_s$, $R'_s$ of Reel R-1 as is well known in the art.

As an improvement feature (described below), reel R-1 has been indicated as provided with two pairs of reference stubs, or projections, RR, RR'; one pair RR projecting inwardly from the top and bottom sides $R_s$, $R'_s$ adjacent the reel hub; and the other pair (RR') adjacent the outer periphery of the sides. The distal faces of such stubs are intended to establish a "reference locus", i.e., plane $R_L$—$R_L$ convenient for use in referencing the position of the superposed so-wound tape edges as described below.

Figures 4, 5:
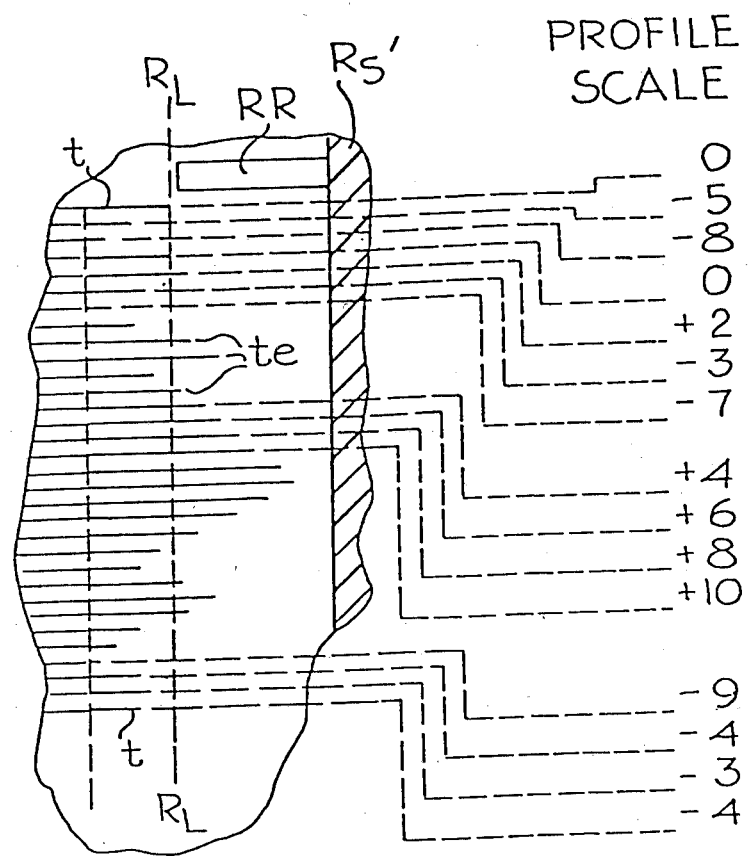
FIG. 4 depicts a representative subsection of the section of FIG. 3, being shown in greatly enlarged idealized fashion in conjunction with FIG. 5 a related "profile scale" indicating relative position of tape windings.

FIG. 4 is a greatly-enlarged view of a portion of such an edge profile from FIG. 3, with each tape edge being given a representative scaler "position-value" relative to such a reference plane $R_L$—$R_L$ in the scale of FIG. 5. That is, exemplary layers of tape are given arbitrary scale values in FIG. 5 (adjacent to the illustrative tape segment in FIG. 4) according to the sense (left/right: +, −) and the degree of variance of each respective tape-edge from reference plane $R_L$—$R_L$.

Now, according to the invention, such an indicated wrapping pattern may be understood as ordinarily "unique" for each unspooling and rewrapping sequence with the tape segments and their ends falling in different respective positions from those of a prior unspooling-/rewind sequence. Such a spooling sequence or wrapping signature may, according to the invention be determined and may be detected; also, where appropriate, it may be recorded in some appropriate fashion as workers in the art can readily visualize.

Thus, in FIGS. 3 and 4 successive wrapping layers of tape t on the hub of reel R-1 may be understood as disposed in a conventional "randomly stacked" fashion wherein a profile along either edge of the superposed tape segments may be thought of as a stacking "fingerprint", or "signature", uniquely identifying the manner in which the tape is so-wrapped on reel R-1. Thus, if the referenced stacking plane $R_L$—$R_L$ is thought of in terms of a "normal" position along which the edges of the tape segments will fall when they are perfectly unskewed and wrapped to lie in registered superposed fashion, —then one may arbitrarily assign values to the "deviations" suffered by each layer (loop) of tape, according to the extent it varies from such normal superposed registry.

As an example the "profile scale" in FIG. 5 is intended as an exemplary indication of the relative position of each tape edge te—with selected edges given a scaler value along the assigned positional scale, e.g., relative to the reference plane $R_L$—$R_L$ between the distal faces of stubs RR, RR' as indicated above. Thus, for instance, the distal face of stub RR has been given a scale value of zero (0) and the tape edges adjacent thereto have been given values successively of: −5, −4, 0, +2, −3, −7 (with the "minus" values being understood as applying to edges falling to one side of the reference plane $R_L$—$R_L$; and the "plus" values applying to edges falling to the other side of $R_L$—$R_L$). Other values are similarly indicated by way of example, in this profile scale, as associated with the relative position of other representative tape edges.

Thus, workers in the art can readily visualize that, using the above described concept of a wrapping "signature" according to the invention, photo-electric detection means may be devised (such as detect unit PDo shown in FIGS. 9-11, described below) which may automatically detect a representation of the position of each successive tape loop edge (e.g., relative to a reference plane such as $R_L$—$R_L$) and so identify all edge positions. The entire array of edge-positions may be thus, identified as a prescribed winding-pattern—e.g., in a scalar code of the type suggested in FIG. 12. In this way, detect/encode/indicator means may automatically provide an indication of the "signature", or overall wrapping profile, of the entire spool of tape (for a given winding sequence).

Workers will be quick to appreciate the usefulness of such a "wrapping signature" concept and will contemplate various ways that it may be detected and identified and/or recorded. They will also contemplate various related techniques for using such a recorded "signature". As one example, with such an arrangement according to the invention, a given set of tapes (tape library) in a certain high-security installation containing secret data may be protected by providing "signature-indication" for each reel, every time tape is wound thereon. Then, any unauthorized use of any tape (involving an unspooling/rewind operation of necessity) may be detected—e.g., in the following manner:

Security PLAN AA:

Authorities could provide electromechanical means, (whereas photo-electric means are here preferred) for automatically detecting the tape wrapping "signature", such as those indicated below relative to FIGS. 6–8. They may require that, after each spooling (rewinding) of tape on any reel, the "wrapping signature" be detected and recorded (preferably automatically or semi-automatically as described below) and provide for any selected encoded representation thereof. Such an encoded "signature" may, for instance, be automatically recorded as data on one, or several portions of the tape itself (and these locations and code may be kept secret from the ordinary operators if such is desired). They may also require that an encoded representation of the "signature" be automatically printed out and imprinted, in human-readable form, somewhwere on (a label) each reel. They may also require that this be recorded elsewhere, such as on a master file remote from the computer installation and relatively immune from tampering by operating personnel.

Moreover, the code itself may of couse, be selected of an arbitrary form—and the code may be changed at will in both space and time. Thus, for instance, a first signature code may be recorded on one or several portions of the tape segment itself; while it may be encoded in a different form to be imprinted upon the tape reel and re-encoded in yet a third form for safekeeping at a remote installation. Further, the encoding process may be rendered relatively simple, automatic, inexpensive and convenient as workers in the art well know. Such a code may be controlled by one, or a very select few, of the security personnel and be changed from time to time at their pleasure.

Workers in the art will readily appreciate that such a system of automatic signature detection and encoded recording can be used in several ways of discourage, if not completely eliminate, unauthorized use of tape files. Each unspooling/ spooling operation will generate its own unique signature (remote from the computer room and inaccessible to the operators there) which uniquely indicates each and every spooling operation. A "spot check" of recorded signatures from time-to-time and unannounced can help greatly to tighten security at such a computer installation. During such a spot check the recorded wrapping "signature" can be compared with the actual wrapping profile on any tape reel (e.g., to detect whether or not the signature recordation system is operative each time an actual spooling occurs-—and this may be combined with an unspooling-/rewinding exercise). Also, the "signature" indicated at the mentioned remote installation may then be compared with the actual condition of selected tape reels— e.g., the monitor agent can, with a separate "feeler gage" or the like, generate his own signature read-out to see if the actual wrapping profile of selected reels corresponds with that recorded for them.

Moreover, it will be readily apparent that the very existance of such a security system, once properly publicized to the operators at such a computer installation, should have a very strong deterrent effect—they can never be sure when a check will be run, and it may reveal that a tape file has illegitimately unspooled and rewound under their jurisdiction. Workers will readily appreciate how valuable such a security system can be and yet how surprisingly simple it is to formulate and implement. As an added filip, it is even possible to arrange and operate the signature detection instrumentation so as to baffle the tape operators themselves—that is, they may be allowed to witness an incredibly accurate demonstration of signature-detection, yet without being told, or being able to perceive how this is accomplished. (They may be unable to deduce that spooled edge alignment is being detected even though they are the ones operating the signature detection equipment). Obviously, a system which has a degree of mystery and yet "uncanny accuracy" can afford added cautionary value to a security system.

Thus, workers will appreciate that this invention involves novel techniques for formulating "tape signatures" (e.g., by developing signature data representing the edgewrapping pattern of a tape coil) and using them (e.g., by comparing such signature data from time to time).

Figure 6:
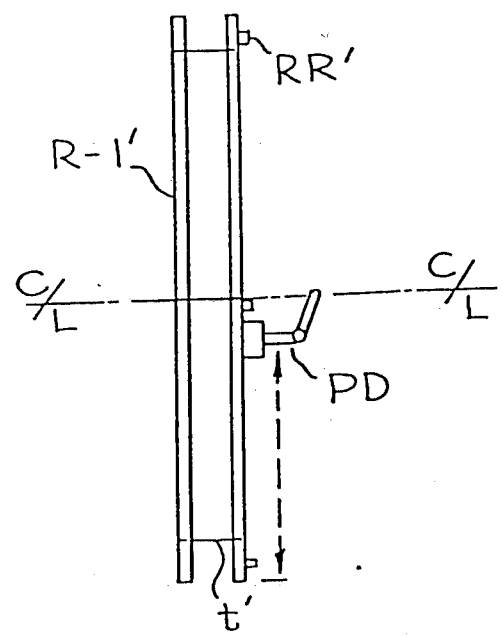
FIG. 6 is an end view of a tape reel RR' generally similar to that in FIGS. 2–4, and emphasizing apparatus, according to a feature, for automatically detecting the wrapping profile of the tape on the reel, with salient functional elements of this detection apparatus being indicated in FIG. 7 in operative relation with portions of the reel, this being indicated very schematically in FIG. 8 in operative relation with a representative, greatly enlarged, subsection of the so-spooled tape, the tape being depicted in the fashion of FIG. 4.
Figure 7:
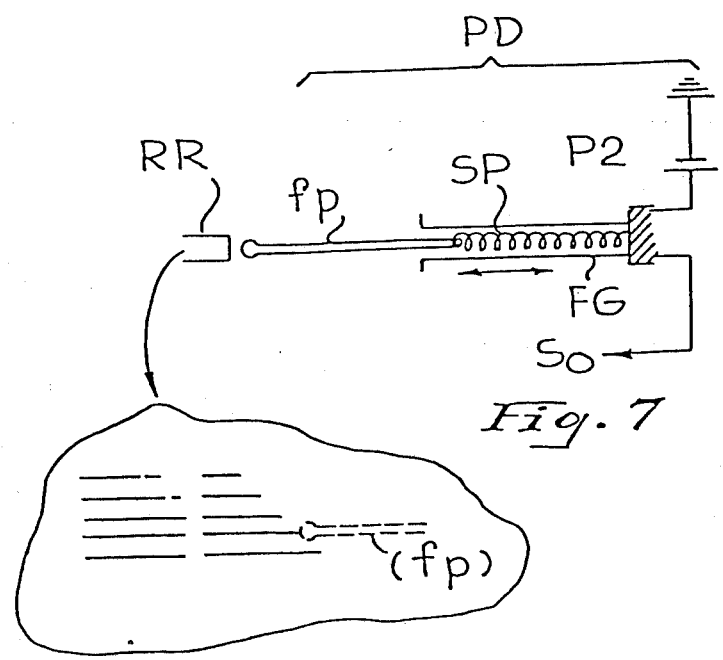
Figure 8:
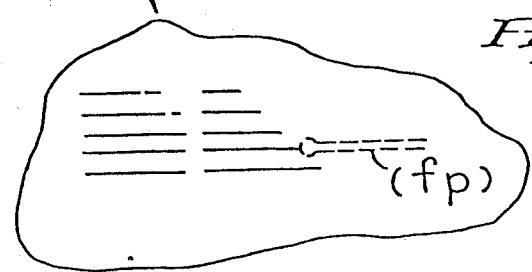

Elec-Mech. signature detection; FIGS. 6–8:

FIGS. 6–8 indicate elec-mechanical means for detecting a tape wrapping "signature" as above described and contemplated, although workers will realize that other detection arrangements and techniques may certainly be used. It will be evident (relative to this and other signature detection arrangements) that it is quite simple, convenient and inexpensive to implement signature detection according to this invention. Here, and elsewhere, it will be understood that the methods, apparatus materials, etc., will be understood as conventional as presently known in the art except as otherwise specified.

FIG. 6 will be understood as an idealized end-view of a tape reel R-1'. A length of tape t' will be understood as wrapped in the conventional manner on reel R-1' (the tape, reel, etc., of FIGS. 6–8 are to be understood as the same as described for FIGS. 1–4 except as otherwise specified). FIG. 6 may be understood in connection with FIG. 2 wherein a profile detector means PD, including a manual handle h, is provided, being adapted to be manually drawn along a groove gg cut through a side RS' of the reel. Thus when such a detector PD is drawn radially across the reel, the individual positions of each successive tape loop or wrapping will be understood as automatically detected and indicated—e.g., in a prescribed selectable code.

More particularly, the functional elements of detector PD are indicated in FIG. 7 as comprising a mechanical detent or feeler pin, fp mounted to be reciprocated linearly along a given guideway FG, being urged outwardly therealong by a coil spring sp which is based and operatively disposed upon the detecting surface of a piezoelectric crystal PS. Crystal PZ may be conventionally connected between a source of current and an output termianl $s_o$ so that, as pin fp is moved toward and away from the detecting surface of PZ, the pin will cause intermediate bias spring sp to apply greater or lesser pressure to this detecting surface. This pressure differential will be understood as conventionally indicated at output $s_o$; for instance, by an increase or decrease in read-out voltage as well known in the art. Pin fp will be understood as drawn (here, manually, although the drive may be made automatic as workers will readily appreciate) along groove gg and arranged to so-engage the edge of each successive wrapped loop of the tape on the reel R-1' as to be shifted in its position toward and away from detector PZ as indicated somewhat schematically in FIG. 8. That is, as the unit PD is drawn, scanningly, across the stacked tape edges, pin fp will be understood as driven, back or forth, against the urging of spring sp, to exert greater or lesser pressure against transducer PZ—the voltage level output thereof being used to represent the position of each successive layer as known in the art.

In this manner, as workers will appreciate, an automatic read-out $S_o$ may be derived to indicate the wrapping profile. This read-out can be denominated as the "wrapping fingerprint" or "signature" of this particular tape when so-wound upon this reel. Of course, for each successive wrapping, a different set of fingerprint will presumably be generated. Moreover, this output may, of course, be readily encoded by means well known in the art, e.g., to indicate a profile scale in the manner of the numerical scale indicated in FIG. 5 and described above.

Modify reel with "reference surfaces":

As a likely embellishment, and to provide a reference fingerprint signal and a reference position for the tape edges, the pair of like annular reference rims RR, RR' are provided about the (inner and outer) circumferences of the reel sides and on the inner surfaces thereof, as indicated above relative to FIGS. 3 and 4. The distal faces of these rims are arranged and positioned to protrude from sides $R_s$, $R_{s'}$ sufficient to define a reference plane $R_L$—$R_L$; this plane intersecting the normal non-skewed position of the wrapped tape edges as for FIG. 4. In this fashion a referenced read-out can be provided at the beginning, and at the end, of each sweep of instrument PD across the reel radius—the faces of rims RR, RR' serving as reference surfaces. Pin fp is arranged to brush across these reference surfaces at the beginning and end of its radial sweep and so provide a "zero reading". In some cases, the detector PD will be arranged to scan either or both sides of such a reel—and in such a case, such rims RR, RR' will be provided on both reel sides (as illustrated).

Preferred embodiment; photoelectric detection, FIGS. 9–13:

With the foregoing background in mind, attention is now directed to FIGS. 9–13 where according to this invention the mentioned wrapping profile or "signature" is to be understood as detected photoelectrically (or a representation of that profile so detected).

Figure 9:
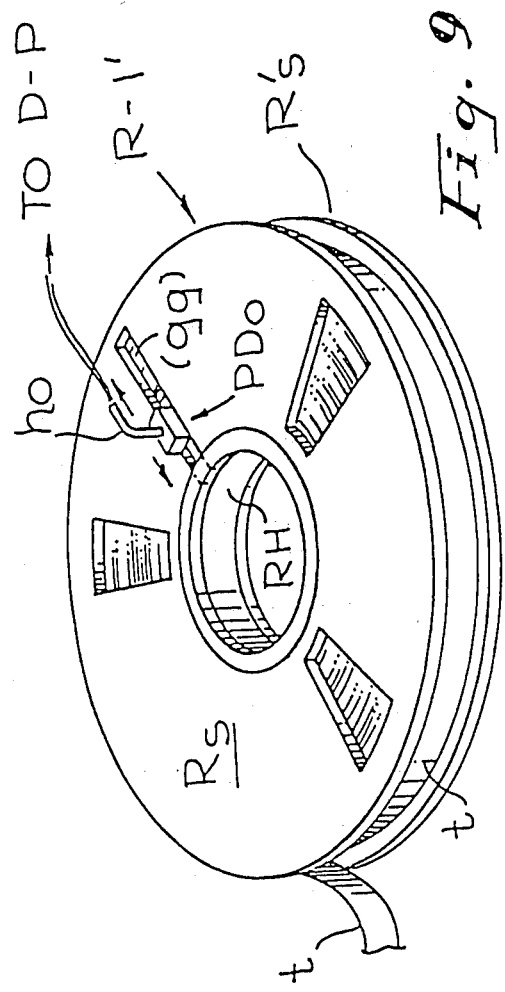

Thus in FIG. 9 the arrangement indicated in FIG. 2 will generally be understood except that the profile detecting unit $PD_o$ is, of course, photoelectrically implemented. Thus, when $PD_o$ is drawn, (for instance, by handle ho) across the radius of reel R-1', photoelectric source-detect means are arranged to follow the wrapping profile and provide an output to associated data processing means D-P as will be explained below.

Figure 10:
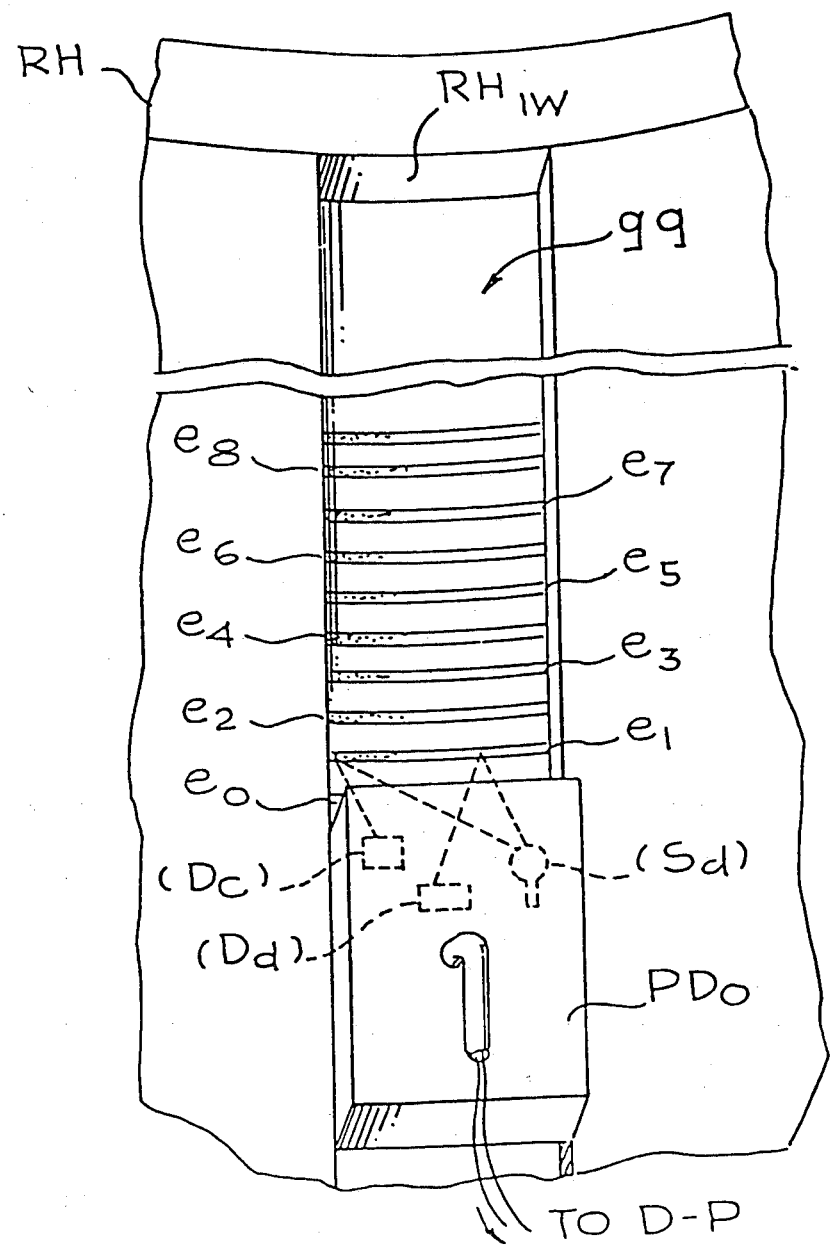

Thus, detect means $PD_o$ is shown in enlarged plan view in FIG. 10 as including one or several radiant energy source means $S_d$ adapted to project a prescribed radiant energy beam (certain cross-sectional area, wavelength, intensity, etc., as known in the art) towards the array of tape edges as it is scanned thereacross. And preferably, this beam is inclined at a prescribed detect angle $\alpha$ (see FIG. 11) with respect to the "tape-plane" direction TP—TP (generally normal to the direction $T_{ax}$, of travel of detector $PD_o$ seen best in FIG. 11).

A corresponding detect means $D_d$ is also provided, as indicated in phantom in FIG. 10, being constituted and operated as understood in the art —i.e., adapted to receive the reflected version of this beam as detect unit $PD_o$ is scanned across the edge array along direction $T_{ax}$. Detector $D_d$ will responsibly emit a detector output, appling it to associated electronic information handling means D-P to process it as known in the art and provide an electronic representation of the "wrapping profile", (e.g., as sample position output curve O-I in FIG. 12, described below).

Figure 11:
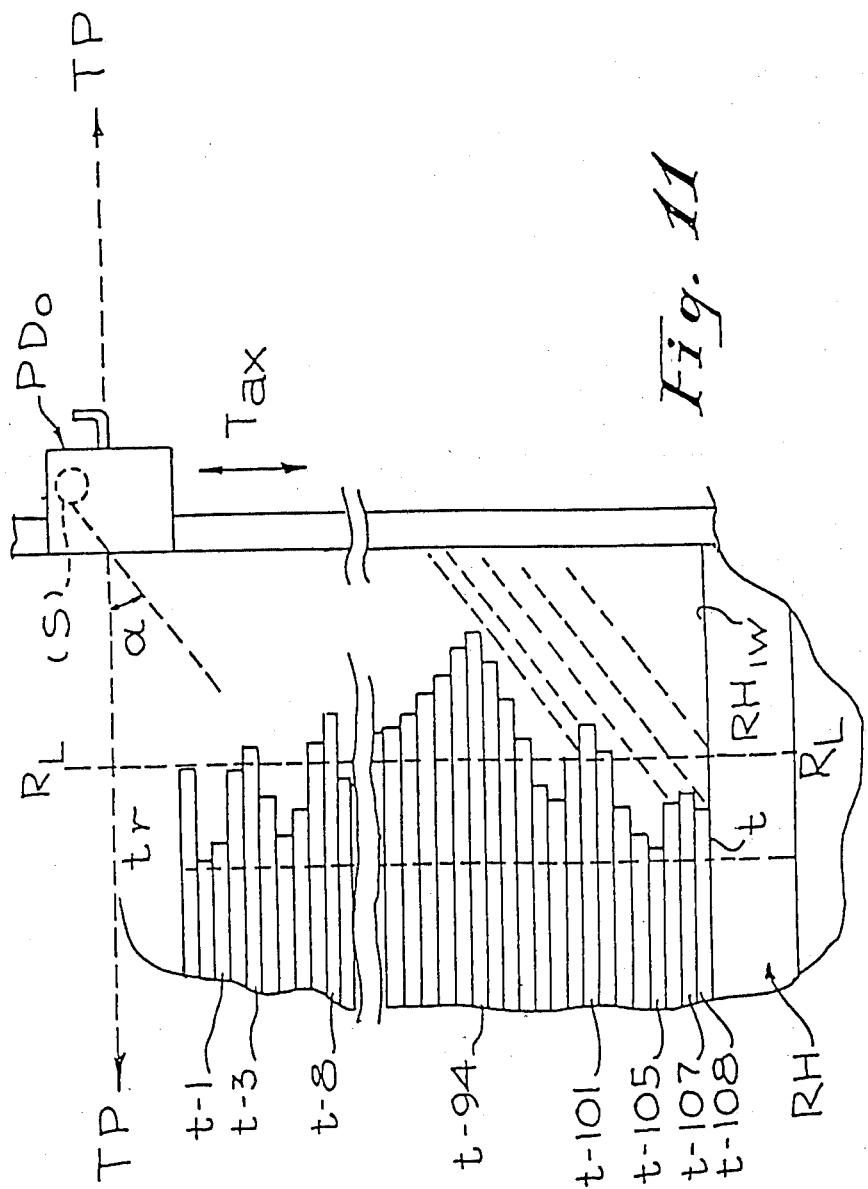

FIG. 11, drawn generally along the lines of FIG. 4, shows in very rough, schematic fashion an exemplary array of tape loop segments t-1, t-3, etc. through t-108, segment t-108 abutting the inner surface $RH_{iw}$ of reel hub RH. It will be here understood that the flat planar surface of the tape (e.g., along TP—TP) exhibits a relatively high reflectivity for the subject embodiment (high reflectance value at the chosen wavelength, intensity, angle of illumination $\alpha$, etc., as known in the art); whereas the tape edges (e.g., e-1, e-3, e-108, etc., see also FIG. 12), exhibit relatively low reflectivity, being fashioned (e.g., coated) to have relatively low reflectance in this case, especially at the prescribed angle $\alpha$.

Figure 12:
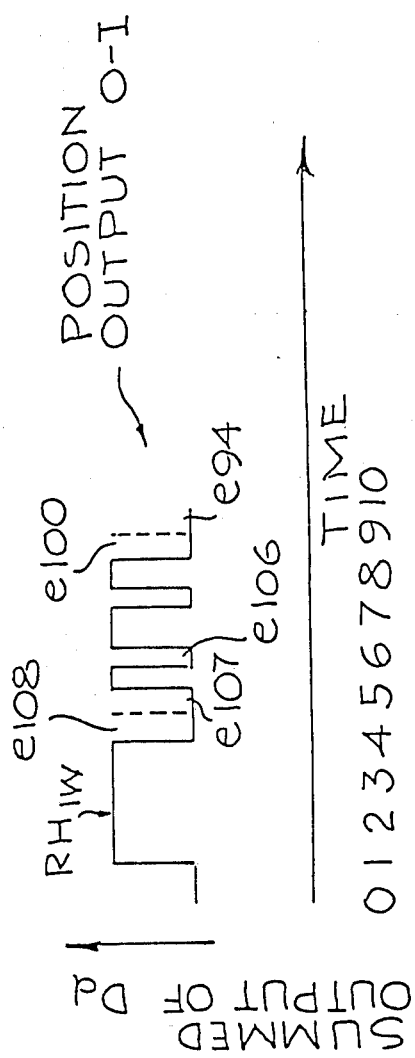

Thus, generally speaking, as unit $PD_o$ is scanned radially across the reel—being guided along channel gg—the detect beam from source $S_d$ will be understood as swept across the array of edges, giving relatively "high" read-out level (at detector $D_d$) while it traverses the flat tape surfaces (high read-out pulse having a width corresponding to the scanning-width of these tape surfaces) as $PD_o$ is so translated, e.g., as seen in FIG. 12, for example. The output will drop to a minimum during each (brief) transit of the beam across the tape edges (as also exemplified in FIG. 12, described below).

Figure 13:
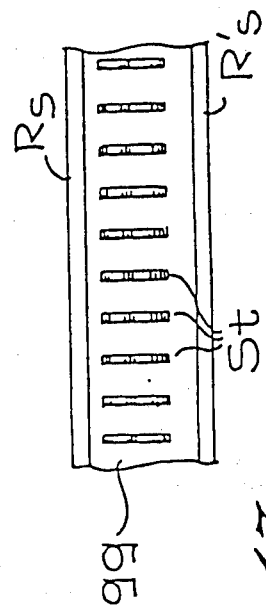

"Clock-pulses":

Also, and according to an improvement feature, another reference beam (e.g., derived by splitting the beam from source $S_d$ or by providing another source, as known in the art) is directed toward the side of channel gg, along which an array of equally-spaced reflector stripes ST, is provided as indicated in FIG. 13. Thus, for each prescribed translation-distance unit, a reference pulse, or "clock spike" output, may be detected at an associated clock detector $D_c$. Such as indicated functionally, for example by clock output O-C in FIG. 12. Stripes ST may be arrayed, equidistant along one side of channel gg (between reel walls $R_2$, $R'_s$). being arranged to exhibit relatively high reflectance of the associated "clock beam". And optimally, the intervals between high-reflectance stripes ST will be fashioned (e.g., coated) to exhibit relatively low reflectance and thus emphasize signal/contrast between clock-spikes (cf. output curve O-C in FIG. 12).

Exemplary operation; FIG. 12:

Thus, a sample position-out O-I is indicated in FIG. 12, representing the output, for instance, of detector $D_d$ as unit $PD_o$ is translated. Here, the detect beam from source $S_d$ will be understood as falling first upon inner reel wall $RH_{iw}$ (at time units 1-4). Wall $RH_{iw}$ is highly reflective too, preferably to provide a reference reflectivity pulse. Unit $PD_o$ then passes successively across tape edges e-108, e-107, e-106, e-100, e-94, etc. (edges e-105, e-104, e-103, e-102 and e-101 are un-indicated for this angle of illumination $\alpha$, being "hidden" or "shadowed" behind protruding tape edge e-101 as shown crudely in FIG. 11. The summed output of detector $D_d$ corresponds to the height of the pulses of output O-I, with a time/distance reference taken along the abscissa as indicated and as known in the art.

As a preferred option, mentioned above, a second (clock) output O-C will also be produced as a time/distance reference as unit $PD_o$ is translated in the fashion aforementioned to produce output O-I. That is, for this a second (clock-)beam is concurrently swept along a side of channel gg to be significantly reflected only by reflective stripes ST, with relatively little or no reflectance therebetween, this being indicated by output O-C of course. In this fashion the time, or speed, of translation of unit $PD_o$ may be eliminated as a variable factor; and thus clock output O-C may serve to "normalize" the position-occurrence of data output pulses O-I as well known in the art.

In some cases of course, such a clock output may not be necessary; but it will often be preferable as workers will recognize.

Modifications; alternate embodiments:

Workers will contemplate alternative means using radiant energy for illuminating and detecting reflectance from such a tape edge profile as well as other ways of developing and using a "wrapping signature", including other ways of encoding the data representing such a signature. For instance, in certain instances the reflectance logic indicated above (for the embodiment of FIGS. 9—13) may be reversed, with the tape edges being highly-reflective (e.g., metal-coated) while the broad, flat planar surface of the tape is made to be relatively non-reflective for this instance (i.e., for this wavelength, incident angle, etc—as workers in the art very well know)—and the output data interpreted accordingly.

Also, the angle of illumination $\alpha$ is made variable (within certain limits) on unit $PD_o$ so as to provide a means of optimizing discrimination between successive tape edges as workers in the art can well appreciate. For instance, where the variation of loop-offset between successive wrapped tape segments is relatively small, angle $\alpha$ will likely be relatively small—the better to illuminate as many edges as possible and minimize "shadowing".

Figure 14:
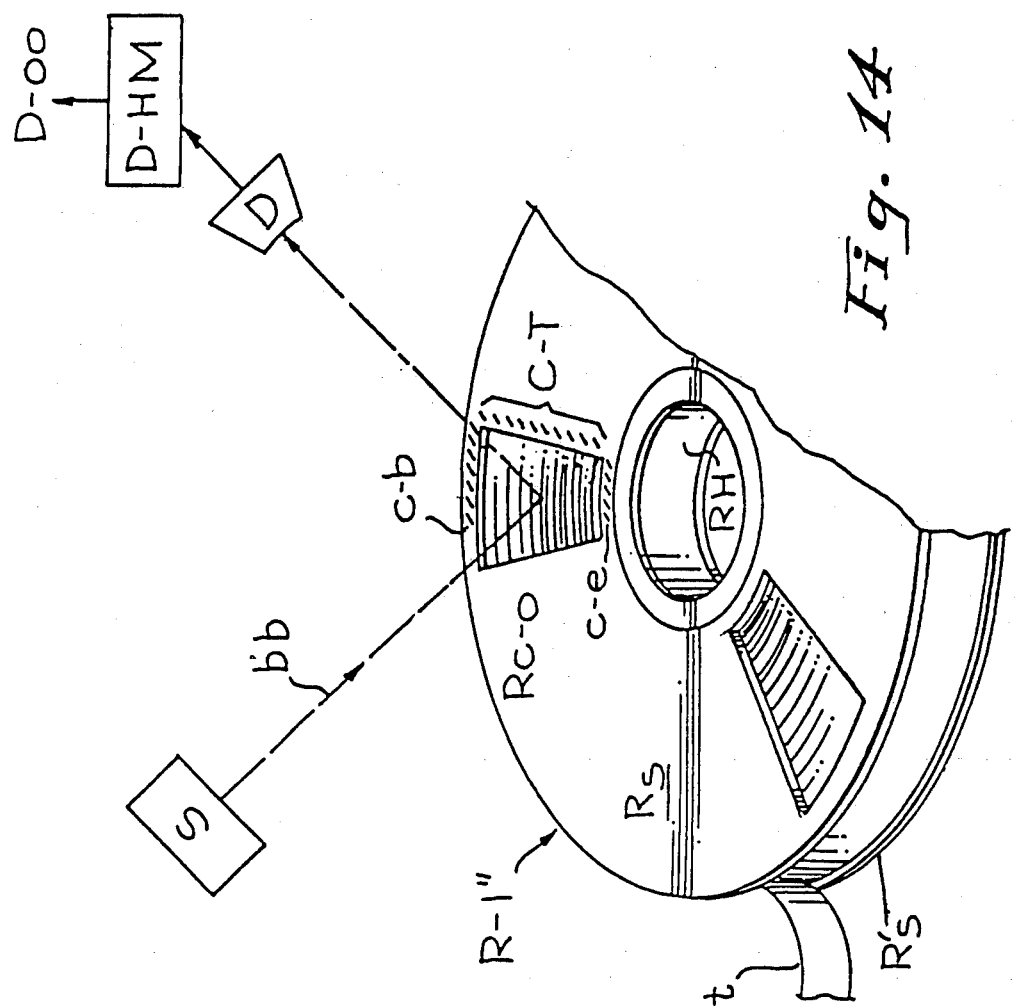
FIGS. 14 and 15 show a like embodiment for remote detection.

Remote source/detect array; FIG. 14:

FIG. 14 represents another embodiment wherein a remotely-located source S of radiant energy (not disposed on reel, like $PD_o$, etc.,) is arranged and adapted to direct a beam bb of prescribed radiation to, and across, the tape edge profile (equipment and techniques well known to workers). Otherwise, the tape t, tape reel R-1" (with sides $R_s$, $R'_s$; hub RH, etc.) is the same as before. An associated radiation-detect unit D is likewise provided, being adapted to receive the reflected version of beam bb; being constituted and operated as known in the art—i.e., adapted to receive the reflected version of beam bb as it is scanned (automatically) across the edge array (reel R-1" assumed fixedly positioned, with a cutout $R_{c-o}$ aligned for this with the beam-scan path, as workers will realize). Detector D will responsibly emit a detector output, applying it to associated electronic information handling means D-HM to process it as known in the art and provide an electronic representation (output D-oo) of the "wrapping profile", (e.g., as with sample position output curve O-I in FIG. 12, described above). It may be assumed that the flat planar surface of the tape exhibits a relatively high reflectivity for the subject radiation beam bb (high reflectance value at the chosen wavelength, intensity, angle of illumination $\alpha$, etc., as known in the art); whereas the tape edges exhibit relatively low reflectivity, being fashioned (e.g., coated) to have relatively low reflectance in this case, especially at the prescribed angle $\alpha$.

Thus, generally speaking, as beam bb is automatically scanned radially across (cut-out $R_{c-o}$ of) the reel, it will be swept across the array of tape edges, giving relatively "high" read-out level (at detector D) where it traverses the flat tape surfaces (high read-out pulse having a width corresponding to the scanning-width of these tape surfaces) and that the output will drop to a minimum during transit of the beam across the tape edges (as with the signal exemplified in FIG. 12, described above).

In certain instances, it will be preferable to use, or adapt, the reel side member ($R_s$ or $R'_s$) to provide "beginning signals" and "scan-end signals" (e.g., like that suggested above). Thus, the related portions of one or both side members may preferably be treated at terminal zones c-b, c-e bracketing (one or several) cutouts $R_{c-o}$ to enhance beam reflectivity to so provide distinctive, recognizable "beginning" and "scan-end" signals respectively.

In addition, the scanning of detect beam bb may be "slaved" to a second "clock beam" (not shown, but understood by workers) in the fashion of the aforedescribed clocking means (e.g., as before, this may be derived by splitting the beam from source $S_d$ or by providing another source-detect array as known in the art). This clock beam may be directed toward the side of cutout $R_{c-o}$ where an array C-T of equally-spaced reflector stripes is preferably provided as indicated in FIG. 14. Thus, for each prescribed translation-distance unit, a reference pulse, or "clock spike" output, may be detected at an associated clock detector (not shown—, for example as with clock output O-C in FIG. 12). These stripes C-T arrayed, equidistant along one side of cutout $R_{c-o}$ will preferably be arranged to exhibit relatively high reflectance of the associated "clock beam". And optimally, the intervals between high-reflectance stripes ST will be fashioned (e.g., coated) to exhibit relatively low reflectance and thus emphasize signal-contrast between clock-spikes (cf. like output curve O-C in FIG. 12).

Figure 15:
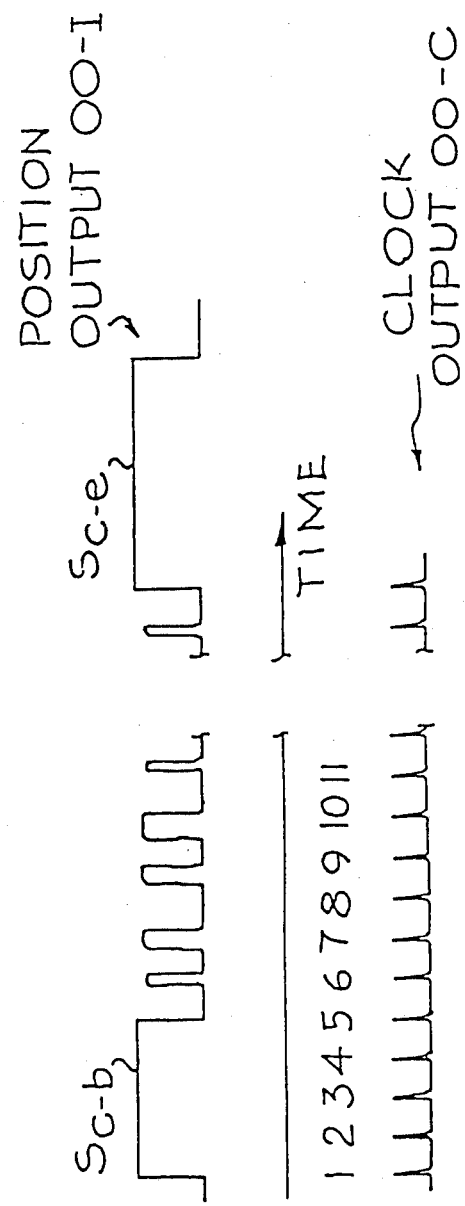

Exemplary operation; FIG. 15

Thus, a sample position-output OO-I is indicated in FIG. 15 (generally like that of FIG. 12), representing the output, for instance, of detector D as beam bb is scanned across cutout $R_{c-o}$, starting at zone c-b. Here, the detect beam from source S will be understood as falling first upon start zone c-b of the reel wall (at time units 1-5). Zone c-b will be understood as highly reflective to preferably provide a reference "start-pulse" $S_{c-b}$. The beam bb then passes successively across tape edges as workers will understand, giving detected signal outputs representing different high-reflectivity portions of the coated tape for the prescribed angle of illumination $\alpha$, here. The summed output of detector D will correspond to the magnitude of the pulses of output OO-I, with a time/distance reference taken along the abscissa as indicated and as known in the art.

As a preferred option, mentioned above, a second (clock) output OO-C will also be produced in synchronism as a time/distance reference as beam bb is translated in the fashion aforementioned to produce output OO-I. That is, for this, a second (clock-)beam is concurrently swept along track C-T at the edge of cutout R$_{co}$ to be significantly reflected only by reflective stripes there, with relatively little or no reflectance therebetween, this being indicated here by output OO-C of course. In this fashion, the time, or speed, of translation of beam bb may be eliminated as a variable factor; and thus clock output OO-C may serve to "normalize" the position-occurrence of data output pulses OO-I as well known in the art.

In some cases of course, such a clock output may not be necessary; but it will often be preferable as workers will recognize.

Workers will recognize that various forms of energy may be employed to generate beam bb (and the associated clock beam, where used). For instance, it will often be found practical and convenient to use a laser source of appropriate wavelength and power, etc., along with known associated beam-scanning means [e.g., wavelength selected to be optimally reflected by shiny tape coating and different from any ambient light, such as normal "computer room illumination"; laser beam intensity must of course be low so as to avoid melting or softening the plastic tape base or its magnetic coating].

Alternatively, workers may, in some cases, prefer to substitute a source of high frequency sound waves with associated detector and scanning means.

Conclusion:

It will be understood that the preferred embodiments described herein are only exemplary, and that the invention is capable of many modifications and variations in construction, arrangement and use without departing from the spirit of the concepts taught. As an example, the means and methods disclosed herein are also applicable for certain other uses as workers will contemplate.

All variations of the invention being merely illustrative, the invention should be considered as including all possible modifications and variations coming within the scope of the invention as defined by the appended claims.

What is claimed is:

1. A method of developing a wrapping profile, or winding signature, for a tape web segment adapted to be wrapped upon a prescribed reel, this method being adapted to enhance computer tape file security so that each time such a web is wound upon a reel, the winding mode, after repeated windings, is assumed to leave the array of wrapped web edges in a unique edge wrap profile represented by the position of each winding edge as sighted radially along one side of the reel, such a profile constituting the "winding signature", this method involving:

providing radiant energy beam means automatically scanning the relative positions of these web-edges and detecting reflections therefrom as a "winding signature", and also providing associated means for electronically representing and storing these position values as a prescribed encoded set of signature-representing signals each time the web is wound; this means being adapted to automatically make such "signature" representations available for use in monitoring unspooling and respooling operations.

2. The method as recited in claim 1, wherein said sets of signals are arranged to be used by arranging for the automatic electronic recordation of web edge positions as encoded signature representations each time a web is so wound; and also providing means to compare such a recordation with a previously determined wrapping profile of a subject reel.

3. The method as recited in claim 1, wherein such signature-representing signals are generated by providing a winding reel with reflective reference surface means about the array of web edges; said reference surface means being arranged to establish a reference reflective surface for normalizing detected values and for orienting web position; and by scanning said beam means across said reference surface means and across the edge of the so-reeled web whereby to provide a set of position-value output signals, indicating the orientation of tape web winding edges relative to a reference locus.

4. The method as recited in claim 3 wherein associated source and receiver means are disposed remote from the tape reel, and operating to determine the relative position of tape edges by detecting reflectance values from exposed tape surfaces.

5. The method of claim 4 wherein laser source and receiver means are used.

6. The method of claim 4 wherein sonic source and receiver means are used.

7. The method of ascertaining whether a given web reel has been unspooled and respooled, this method being means of enhancing tape file security and comprising:

providing energy beam means remote from the reel and adapted to automatically detect the wrapping profile of the tape edges in the form of a prescribed set of "wrapping signature" signals which are electronic representations of the relative position of the spooled edges of the web and/or the extent to which they are offset from one another; and also providing associated electronic compare means for comparing this set of signature signals with a known "standard".

8. The method as recited in claim 7, involving established reflectance reference surface means; scanning the wrapped web and detecting the relative protrusion of successive loop edges and their respective reflectance values relative to said reference surface means; and assigning values to the deviations of each loop edge relative to at least one prescribed reference plane.

9. The method as recited in claim 7, wherein such a wrapping profile is automatically detected for each and every web-spooling sequence by detecting loop-edge position and electronically encoding the successive position readings with the "standard" to generate a unique "fingerprint" characteristic of each wrapping operation, this standard devised as electronic representations of prior reference positions of the edges.

10. Apparatus for developing a "stacking fingerprint", or wrap signature, to uniquely identify each magnetic tape spooling operation, automatically and electronically, as carried out on associated tape reel means, this apparatus comprising:

energy source means disposed remote from said tape reel means and adapted to generate and scan an energy beam radially across the so-wrapped tape to be reflected thereby and present a reflected beam indicating the position of the wrapped edges;

beam detect means to detect the so-reflected beam and responsively generate "signature signals" as an output indication thereof; and electronic output means adapted to receive and process said "signature signals".

11. The combination as recited in claim 10 as combined with electronic code generating means adapted to automatically convert said signature signals to a "wrapping code" representation.

12. The combination as recited in claim 11, as combined with means for receiving and automatically storing the signature signals each time a tape is spooled, whereby a monitoring sequence is facilitated during which a wrapped taping segment may be rescanned to generate a "present wrapping code" representation for comparison with the so-stored automatic representation of a prior wrapping code, this as a means for checking file security.

13. An improved method of winding recording tape on a prescribed spool means so as to later ascertain whether the tape has been unspooled and respooled, this method comprising:

automatically detecting the wrapping profile of the tape edges after each spooling sequence with remote detect-beam means in the form of a prescribed wrapping "signature" constituting beam reflections from the tape edges as-spooled; and electrically encoding and storing this "signature" so as to compare it with a known standard.

14. The method as recited in claim 13, including the step of also detecting reflections from a mechanical reference wrapping locus on at least one portion of the spool means whereby to automatically so orient the position of each wrapped tape edge relative to the reference locus.

15. The method as recited in claim 14, wherein tape edge positions are automatically detected by a remote laser beam means and are encoded into a chain of edge-position indicia signals and wherein those indicia signals are automatically stored as a representation of the wrapping signature of the tape each time the tape is spooled.

16. The method as recited in claim 15, wherein, each time said tape is spooled, the wrapping signature signals are developed, representing the edge-wrapping pattern of the spooled tape, and these are stored by electronic storage means adapted to facilitate electronic comparison of the so-developed signals with a standard pattern representing a prior, or other reference wrapping.

17. Segment storage means including cylindrical hub means on which an elongate segment may be spooled and wrapped through many turns; and, operatively associated therewith, a detect-beam array disposed remote from the hub means and adapted to scan one or several energy beams along at least a portion of the so-spooled segments to be reflected thereby in the form of a wrap-indicating reflected beam, this reflecting beam being detected by associated detect means and converted into a set of "wrap-signature-signals".

18. The apparatus as recited in claim 17, wherein the detect beam array uses laser beam energy.

19. The apparatus as recited in claim 18, as combined with signature detect means comprising scanning laser beam means and associated beam-reflectance detect means, both located remote from the hub means.

20. The apparatus as recited in claim 19, wherein electronic encoding means are provided and adapted to develop a chain of electronic position indicia representing variance of each spooled segment from a reference plane.

* * * * *

UNITED STATES PATENT AND TRADEMARK OFFICE
CERTIFICATE OF CORRECTION

PATENT NO. : 4,565,927
DATED      : January 21, 1986
INVENTOR(S): Herbert U. Ragle It is certified that error appears in the above-identified patent and that said Letters Patent is hereby corrected as shown below:

Col. 3, line 42, change "reel-web" to --reeled-web--.

Col. 5, line 38, change "an" to --any--.

Col. 8, line 56, change "$R_2$" to --$R_s$--.

Col. 14, line 21, change "reflecting" to --reflected--.

Signed and Sealed this

Nineteenth Day of August 1986

[SEAL]

Attest:

DONALD J. QUIGG

Attesting Officer

Commissioner of Patents and Trademarks